United States Patent [19]
Sato

[11] Patent Number: 5,247,502
[45] Date of Patent: Sep. 21, 1993

[54] OPTICAL INFORMATION RECORDING AND/OR REPRODUCING APPARATUS AND METHOD FOR SAMPLING AN IRRADIATION STATE ERROR SIGNAL

[75] Inventor: Mikio Sato, Tokyo, Japan

[73] Assignee: Canon Kabushiki Kaisha, Tokyo, Japan

[21] Appl. No.: 7,825

[22] Filed: Jan. 22, 1993

Related U.S. Application Data

[63] Continuation of Ser. No. 652,538, Feb. 8, 1991, abandoned.

[30] Foreign Application Priority Data

Feb. 16, 1990 [JP] Japan .................... 2-33887

[51] Int. Cl.⁵ .............................................. G11B 7/00
[52] U.S. Cl. ............................... 369/44.34; 369/44.35
[58] Field of Search ............... 369/44.29, 44.34, 44.35, 369/44.28, 44.27, 44.36, 124, 106

[56] References Cited

U.S. PATENT DOCUMENTS

| | | | |
|---|---|---|---|
| 4,286,318 | 8/1981 | Immink et al. | 369/44.35 |
| 4,707,816 | 11/1987 | Yonezawa et al. | |
| 4,785,442 | 11/1988 | Ohtake et al. | 369/44.34 |
| 4,866,688 | 9/1989 | Ohtake et al. | |
| 4,872,152 | 10/1989 | Tsuyoshi et al. | 369/44.34 |
| 4,949,331 | 8/1990 | Maeda et al. | |

FOREIGN PATENT DOCUMENTS

| | | |
|---|---|---|
| 0138273 | 4/1985 | European Pat. Off. . |
| 0261916 | 3/1988 | European Pat. Off. . |
| 0270357 | 6/1988 | European Pat. Off. ......... 369/44.34 |
| 3620301 | 1/1987 | Fed. Rep. of Germany . |
| 3641587 | 6/1987 | Fed. Rep. of Germany . |
| 3643572 | 6/1987 | Fed. Rep. of Germany . |
| 2544535 | 10/1984 | France . |
| 2141266 | 12/1984 | United Kingdom . |

Primary Examiner—W. R. Young
Assistant Examiner—Thang V. Tran
Attorney, Agent, or Firm—Fitzpatrick, Cella, Harper & Scinto

[57] ABSTRACT

In apparatus for recording information and/or reproducing information by irradiating a light beam to a disk shaped optical recording medium, there are provided an adjusting mechanism for adjusting an irradiation state of the light beam to the recording medium, a detector for detecting an irradiation sate error signal of the light beam transmitted or reflected from the recording medium to the recording medium. Further, there are provided a feedback circuit, a storing device and providing circuit. In the feedback circuit, the irradiation state error signal obtained by the detector is sampled at a predetermined rate to generate a control signal for the adjusting mechanism by use of the sampled irradiation state error signal, and the control signal is fed back to the adjusting mechanism. The sampling of the irradiation state error signal is effected at a different rate from that in the detector and the sampled irradiation state error signal is stored in the storing device. The irradiation state error signal stored in the device is input to the feedback circuit by the providing circuit.

12 Claims, 5 Drawing Sheets

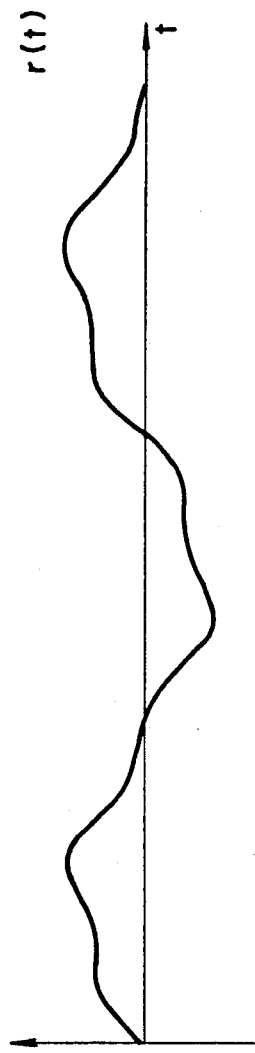
FIG. 2A SIGNAL FROM MEDIUM
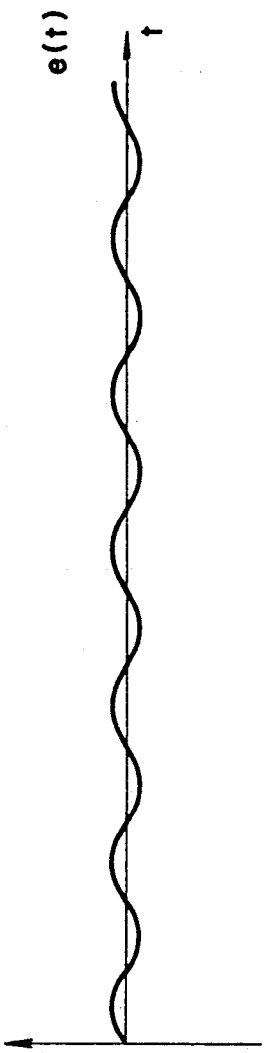
FIG. 2B SERVO ERROR SIGNAL
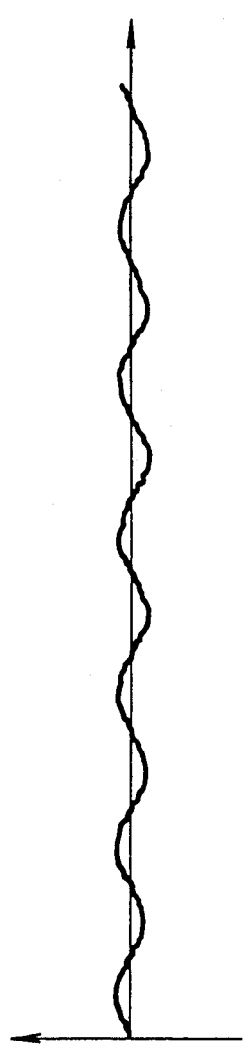
FIG. 2C OUTPUT OF SAMPLER 7

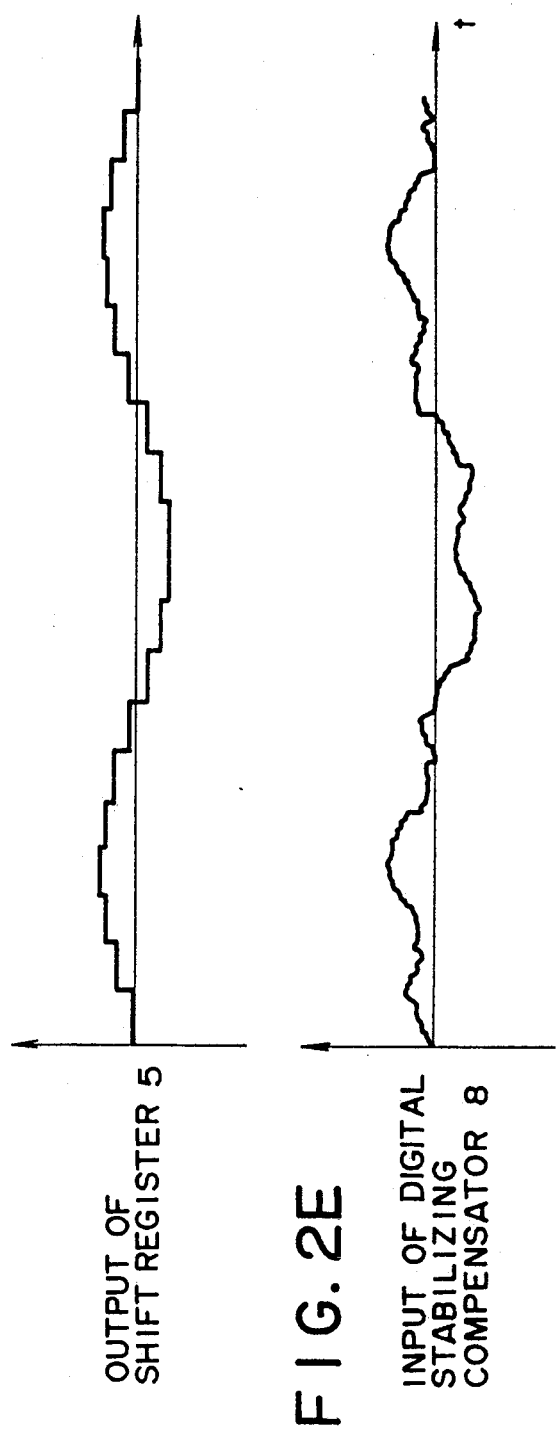

OPTICAL INFORMATION RECORDING AND/OR REPRODUCING APPARATUS AND METHOD FOR SAMPLING AN IRRADIATION STATE ERROR SIGNAL

This application is a continuation of application Ser. No. 07/652,538 filed Feb. 8, 1991, now abandoned.

BACKGROUND OF THE INVENTION

1. Field of the Invention

The present invention relates to an optical information recording and reproducing apparatus for recording and/or reproducing information by using a light beam.

2. Related Background Art

An optical disk drive which uses an optical disk as a recording medium has been recently attracting notice as an external storage for a computer. In such an optical disk, record tracks are formed spirally or concentrically, and information is recorded on the tracks as record pits. Since the pitch of the tracks is usually 1-2 μm to provide a high recording density, the optical disk drive may be used as a large capacity storage device.

In order to record information on an optical disk or reproduce the information recorded on the optical disk, an optical head for irradiating the optical disk with a laser beam is used. The optical head comprises a semiconductor laser which emits a laser beam and an objective lens actuator which adjusts the irradiation status of the laser beam with respect to the optical disk (at least one of focusing and tracking), and it controls the drive of the optical head by controlling the objective lens actuator so that the laser beam is projected on to a target track on the optical disk.

In order to control the optical head, a high gain and wide band servo system is required, but it is extremely difficult to attain sufficient stability in such a high gain and wide band servo system. Where the servo system comprises a digital control circuit, it is much more difficult to attain sufficient stability than in an analog control circuit because of wasted time due to the operation time for the control operation or the phase turn-around in a high frequency range due to a zero-order holder.

In order to solve the above problems, it has been proposed to construct a control system by building in a repetition compensator which uses a shift register. The repetition compensator has as many shift register stages as the number of times sampling occurs in one period in one rotation of the disk and stores a servo error signal for each sampling operation. At each sampling, it produces the servo error signal of the previous sampling and adds the output signal and a current servo error signal to cancel a periodic variation due to the eccentricity of the disk. This will be discussed in detail later. Thus, since the repetition compensator has a high tracking characteristic with respect to the target, the gain of the digital stabilization compensator which produces the control signal for the objective lens actuator can be significantly reduced. As a result, the control system is stabilized, a higher gain is attained than a system without the repetition compensator, and the tracking characteristic is improved.

However, in the prior art, since the sampling frequency of the repetition compensator and the digital stabilization compensator are set to the same value, such a system has the following problems. The frequency band required for the repetition compensator is several times as high as a rotation frequency of the disk. Since the normal rotation frequency of the disk is about 50 Hz, the upper limit of the required frequency band is approximately several hundreds Hz. On the other hand, the frequency band required for the digital stabilization compensator is up to several KHz. Thus, if the sampling frequencies of both compensators are to be set equally, they should be set to several tens of KHz which conforms to the sampling frequency of the digital stabilization compensator while taking into account the fact that the sampling frequency of the digital control system is usually ten times as high as the frequency band. As a result, the number of stages of the shift register which stores the servo error signals of the rotation period of the disk increases and the circuit configuration becomes extremely complex.

Assuming that the rotation frequency of the disk is 50 Hz (3,000 rpm), the frequency band required for the repetition compensator may be approximately ten times as high as the fundamental frequency which is the rotation frequency of the disk, and the sampling frequency of the repetition compensator may be approximately ten times as high as the frequency band of the repetition compensator, that is, approximately 5 KHz. Where the sampling frequency of the repetition compensator is 5 KHz, the number of stages of the shift register is 100.

On the other hand, if the sampling frequencies of the repetition compensator and the digital stabilization compensator are set equally, the sampling frequency of the repetition compensator is several tens of KHz. For example, when the sampling frequency of the repetition compensator is 50 KHz, the number of stages of the shift register is 1,000, which requires ten times as large a memory capacity as that required in the previous example. Thus, in the prior art, since the sampling frequencies of the repetition compensator and the digital stabilization compensator are equally set, many shift register stages are used and the circuit configuration of the control system is very complex.

SUMMARY OF THE INVENTION

In the light of the above, it is an object of the present invention to provide a disk drive which lowers the sampling frequency of a repetition compensator in order to reduce the number of shift registers.

The above object is achieved by an apparatus for recording and/or reproducing information on and/or from a disk-shaped optical recording medium by irradiating the recording medium with a light beam, comprising; adjust means for adjusting the irradiation state of the light beam with respect to the recording medium; irradiation state error detection means for detecting an irradiation state error signal of the light beam with respect to the recording medium based on light reflected or transmitted by the recording medium; a feedback circuit for sampling the irradiation state error signal produced by the detection means at a predetermined sampling rate to generate a control signal for the adjust means in accordance with the sampled irradiation state error signal and feed the control signal back to the adjust means; store means for sampling the irradiation state error signals in one period of the recording medium at a different sampling rate than the sampling rate and storing the sampled irradiation state error signals; and a supply circuit for supplying the irradiation state error signals stored in the store means to the feedback circuit.

BRIEF DESCRIPTION OF THE DRAWINGS

FIGS. 2A to 2E show time charts of an operation of the apparatus of FIG. 1.

DETAILED DESCRIPTION OF THE PREFERRED EMBODIMENTS

Figure 1:
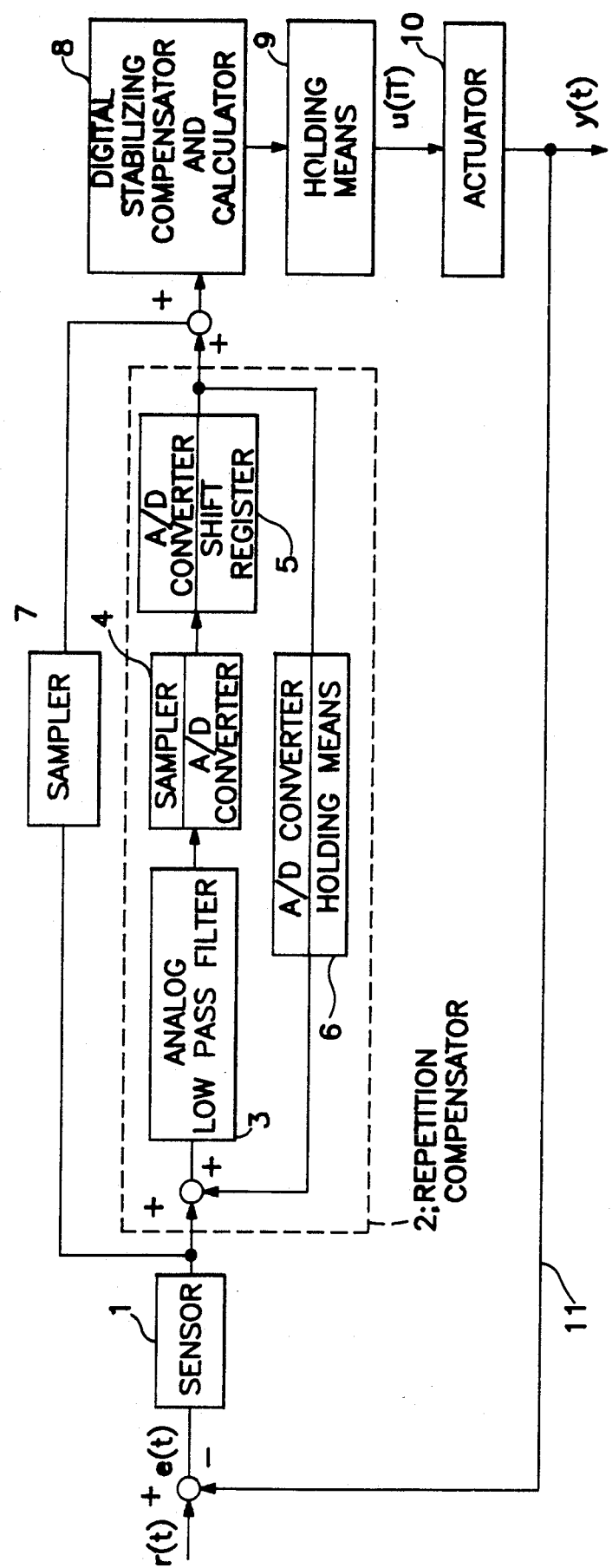
FIG. 1 shows a block diagram of one embodiment of an optical information recording and reproducing apparatus of the present invention.

Embodiments of the present invention are now explained with reference to the accompanying drawings. FIG. 1 shows a block diagram of one embodiment of the optical information recording and reproducing apparatus of the present invention. In the following embodiment, a tracking servo control is specifically discussed.

In FIG. 1, numeral 1 denotes a sensor for detecting a servo error signal which indicates a positional error between a target track on a recording medium and an irradiation spot of a laser beam (hereinafter referred to as a laser spot). The detection method may be a conventional push-pull method. The sensor 1 calculates the difference between a laser spot target r(t) and an actual actuator position y(t) to produce the servo error signal e(t) which is error information for the target track.

Numeral 2 denotes a repetition compensator which comprises an analog low-pass filter 3, a sampler 4 including an A/D converter, a shift register 5 and holding means 6 including a D/A converter. The sampler 4 samples the servo error signals at a predetermined rate in one period during which the recording medium rotates one revolution. The servo error signals sampled by the sampler 4 are stored in the shift register 5. Accordingly, the shift register 5 has as many stages as the number of sampling operations in one-rotation period of the recording medium.

Numeral 7 denotes a sampler which comprises an A/D converter, and it samples the servo error signals at a predetermined rate. As described above, the sampling frequency requires at least several tens of KHz while the sampling frequency of the repetition compensator 2 is set to one quarter of the sampling frequency of the sampler 7. Because of the reduction of the sampling frequency, the number of stages of the shift register 5 is reduced accordingly. A digital stabilization compensator 8 calculates a control amount to an actuator 10 at the sampling frequency of the sampler 7. Numeral 9 denotes holding means which comprises a D/A converter, and numeral 10 denotes an object lens actuator which is controlled by the control signal of the digital stabilization compensator 8 as described above. A control result of the actuator 10 is fed back to an input circuit through a feedback loop 11. The object lens actuator 10 is controlled in accordance with an error from the input signal such that the laser spot is moved to the target track.

A specific operation of the present embodiment is now explained with reference to FIG. 2.

FIG. 2A shows the target value r(t) to be followed. The signal r(t) includes a rotation frequency and frequency components which are multiples of the rotation frequency, due to the eccentricity of the recording medium. FIG. 2B shows the deviation e(t) between r(t) and the actual actuator position y(t). The signal e(t) is detected by the sensor 1, and outputted from the sensor 1 as a servo error signal.

FIG. 2C shows an output signal of the sampler 7, and FIG. 2D shows an output signal of the shift register 5. As described above, the shift register 5 stores the servo error signals at the predetermined rate in one-rotation period of the recording medium. The number of stages of the shift register 5 is set to the number of sampling operations of the sampler 4 in one-rotation period of the recording medium. Accordingly, the shift register 5 sequentially stores the servo error signals at each sampling by the sampler 4 and sequentially outputs the servo error signals of one-period earlier. The sampling frequency of the sampler 4, that is, the sampling frequency $f_2$ of the repetiton compensator 2 is set lower than the sampling frequency $f_1$ of the digital stabilization compensator 8. In the present embodiment, the ratio of $f_2/f_1$ is 1/4. The sampling frequency of the digital stabilization compensator 8 is the sampling frequency of the sampler 7.

FIG. 2E shows a sum signal of the output of the shift register 5 and the output of the sampler 7. The digital stabilization compensator 8 calculates the control amounts for the objective lens actuator 10 based on the sum output in accordance with a predetermined formula at each sampling by the sampler 7 so that the laser spot follows the target track. As described above, the signal r(t) from the recording medium includes the rotation frequency of the recording medium and the frequency components which are multiples of the rotation frequency, which causes the tracking characteristic of the laser spot on the track to deteriorate. The shift register 5 holds one period of servo error signals and sequentially outputs the servo error signals of one period earlier. By reflecting the servo signals of one period earlier, the periodic disturbance due to the eccentricity of the recording medium is suppressed and the tracking ability of the laser spot is enhanced. In the present embodiment, the sampling frequency of the repetition compensator is set to ¼ of that of the digital stabilization compensator as described above, but the tracking ability of the laser spot is substantially same as that when the sampling frequencies of both compensators are set equally.

Figure 3:
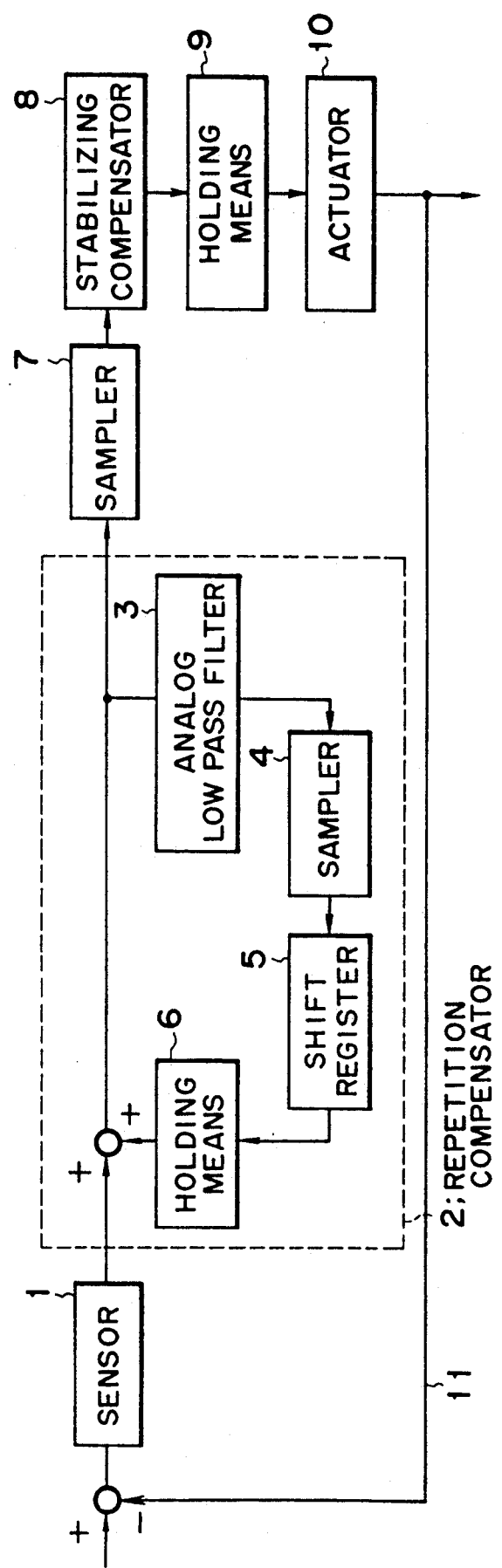
FIG. 3 shows a block diagram of another embodiment of the optical information recording and reproducing apparatus of the present invention.

FIG. 3 shows a block diagram of another embodiment. In the present embodiment, an internal connection of the repetition compensator 2 has been modified so that the analog low-pass filter 3, the sampler 4, the shift register 5 and the holding means 6 are connected in series. The output of the holding means 6 is added to the servo error to be inputted to the sampler 7. Like in the previous embodiment, the shift register 5 sequentially stores the servo error signals at each sampling time which is set by the sampler 4. It also outputs the sampled values of one period earlier at each sampling time for the addition to the servo error signal to be inputted to the sampler 7 so that the periodic disturbance due to the eccentricity of the recording medium is suppressed.

In the present embodiment, the sampling frequency of the repetition compensator 2 is again set lower than the sampling frequency of the digital stabilization compensator 8. Thus, in the present embodiment, the capacity of the shift register 5 can be reduced and the same effect as that in the previous embodiment is attained.

Figure 4:
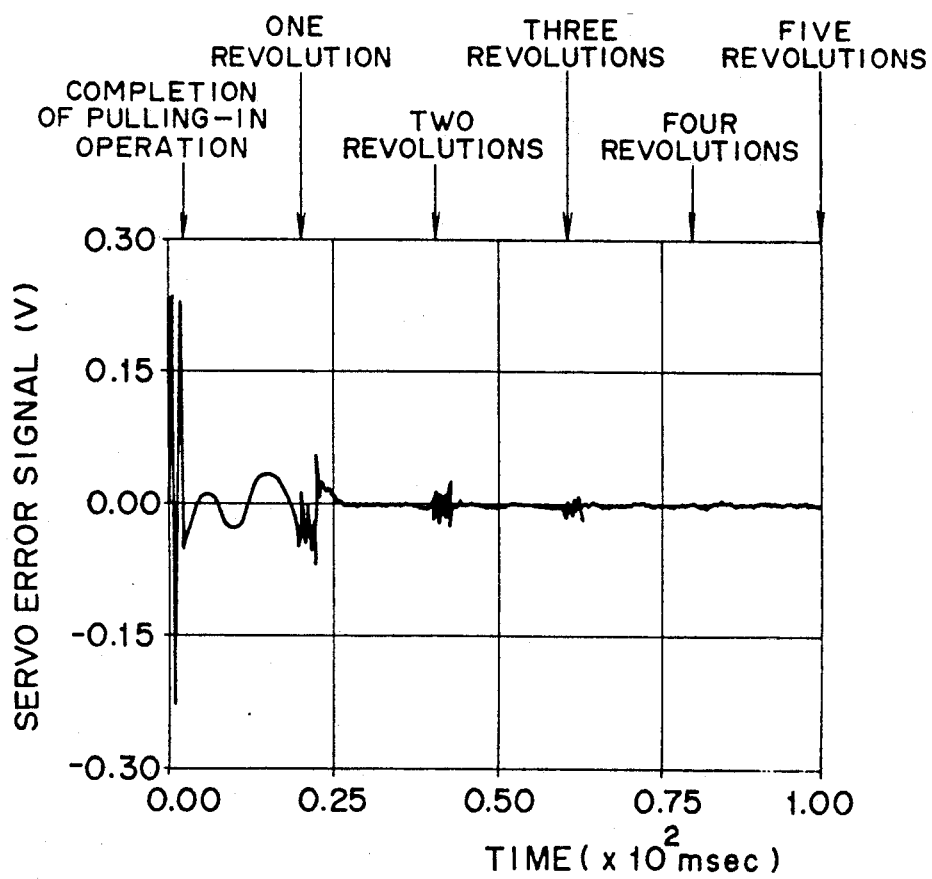
FIG. 4 shows a characteristic chart of a change in a servo error signal to the rotation of a recording medium in the optical information recording and reproducing apparatus of the present invention.

An experiment result is now explained. According to a simulation test by the inventors, the result shown in FIG. 4 was obtained. FIG. 4 shows a characteristic chart of the measurement of the change in the servo error signal with respect to the number of rotations (time) of the recording medium. The conditions of the experiment are that the ratio $f_2/f_1$ of the sampling frequency $f_1$ of the repetition compensator and the sampling frequency $f_2$ of the digital stabilization compensator is 5, and the initial value of the shift register is all-zero. As seen from FIG. 4, the servo error signal is substantially zero after the second rotation of the recording medium. This indicates that the laser spot and the target track coincide and the laser spot tracks the target track well. The servo error signal is not zero at the first rotation of the recording medium after the pull-in of the servo error signal. This is due to the fact that the initial value of the shift register has been set to zero. Accordingly, a steady error of the rotation frequency and the frequency components which are multiples of the rotation frequency remains only in the first rotation of the recording medium but this does not raise any practical problem. Where the sampling frequency $f_1$ of the repetition compensator is set to 1/5 of the sampling frequency $f_2$ of the digital stabilization compensator so that the capacity of the shift register is reduced to 1/5, the control system operates equally well as the control system having the ratio $f_2/f_1$ of 1.

In accordance with the present invention, the sampling frequency of the repetition compensator is set lower than that of the digital stabilization compensator. As a result, the capacity of the shift register used in the repetition compensator can be effectively reduced without any effect on to the control operation. Accordingly, the circuit configuration of the apparatus is simplified and the reduction of size and cost of the apparatus is attained.

While the tracking servo control is explained in the above embodiments, the present invention is applicable to not only the tracking servo control but also the focusing servo control and the servo control of a spindle motor which drives the recording medium.

What is claimed is:

1. An apparatus for recording and/or reproducing information on and/or from a disk-shaped optical recording medium by irradiating a recording medium with a light beam, comprising:
    adjusting means for adjusting an irradiation state of the light beam on the recording medium;
    irradiation state error detection means for detecting light of the light beam reflected or transmitted by the recording medium and for outputting an irradiation state error signal;
    a feedback circuit for sampling the irradiation state error signal outputted from said detection means at a predetermined sampling rate to generate a control signal for said adjusting means in accordance with a sampled irradiation state error signal and to feed the control signal back to said adjusting means; and
    sample and store means for sampling the irradiation state error signal in one period of the recording medium at a different sampling rate from said predetermined sampling rate and storing the sampled irradiation state error signal,
    wherein said sample and store means supplies the sampled irradiation state error signal stored therein to said feedback circuit.

2. An apparatus for recording and/or reproducing information according to claim 1, wherein the irradiation state error signals supplied to said feedback circuit are one period retarded from the irradiation state error signal currently supplied to said feedback circuit.

3. An apparatus for recording and/or reproducing information according to claim 2, wherein said feedback circuit adds the irradiation state error signal obtained by said detection means to the irradiation state error signal of one period earlier supplied from said store means to generate a sum signal and generates the control signal based on the sum signal.

4. An apparatus for recording and/or reproducing information according to claim 3, wherein said feedback circuit includes a digital calculator for calculating the sum signal in accordance with a predetermined formula.

5. An apparatus for recording and/or reproducing information according to claim 1, wherein said sample and store means includes an A/D converter and memory means.

6. An apparatus for recording and/or reproducing information according to claim 5, wherein said memory means is a shift register.

7. An apparatus for recording and/or reproducing information according to claim 1, wherein the sampling rate of said sample and store means is ¼ to 1/5 of the sampling rate of said feedback circuit.

8. An apparatus for recording and/or reproducing information according to claim 1, wherein the irradiation state includes a tracking state and/or a focusing state.

9. A method for recording and/or reproducing information on and/or from a disk-shaped optical recording medium by irradiating a recording medium with a light beam, comprising the steps of:
    detecting light of the light beam reflected or transmitted by the recording medium and outputting an irradiation state error signal;
    sampling and storing the irradiation state error signal in one period of the recording medium at a predetermined rate;
    sampling the irradiation state error signal outputted in said detection step at a different sampling rate from said predetermined rate, and generating a control signal for controlling the light beam based on the sampled irradiation state error signal and the stored irradiation state error signal; and
    controlling the irradiation state of the light beam on the recording medium in accordance with the control signal.

10. A method for recording and/or reproducing information on and/or from a disk-shaped optical recording medium by irradiating a recording medium with a light beam, comprising the steps of:
    detecting light of a light beam reflected or transmitted by the recording medium and outputting an irradiation state error signal;
    sampling and storing the irradiation state error signal in one period of the recording medium at a predetermined rate;
    adding the irradiation state error signal outputted in said detecting step and the irradiation state error signal stored in said sampling and storing step to form a sum signal, sampling the sum signal at a different sampling rate from said predetermined rate, and generating a control signal for controlling the light beam based on the sampled signal; and controlling the irradiation state of the light beam on the recording medium in accordance with the control signal.

11. An apparatus for recording and/or reproducing information on and/or from a disk-shaped optical recording medium by irradiating a recording medium with a light beam, comprising:
adjusting means for adjusting an irradiation state of the light beam on the recording medium;
irradiation state error detection means for detecting light of the light beam reflected or transmitted by the recording medium and for outputting an irradiation state error signal;
a feedback circuit for sampling the irradiation state error signal outputted from said detection means at a predetermined sampling rate to generate a control signal corresponding to said irradiation state error signal for said adjusting means in accordance with a sampled irradiation state error signal and to feed the control signal back to said adjusting means; and
sample and store means for sampling the signal corresponding to said irradiation state error signal in one period of the recording medium at a different sampling rate from said predetermined sampling rate and storing the sampled signal,
wherein said sample and store means supplies the sampled signal stored therein to said feedback circuit.

12. An apparatus for recording and/or reproducing information on and/or from a disk-shaped optical recording medium by irradiating a recording medium with a light beam, comprising:
adjusting means for adjusting an irradiation state of the light beam on the recording medium;
irradiation state error detection means for detecting light of the light beam reflected or transmitted by the recording medium and for outputting an irradiation state error signal;
a feedback circuit for sampling the irradiation state error signal outputted from said detection means at a predetermined sampling rate to generate a control signal for said adjusting means in accordance with a sampled irradiation state error signal and to feed the control signal back to said adjusting means; and
sample and store means for sampling a signal in said feedback circuit in one period of the recording medium at a different sampling rate from said predetermined sampling rate and storing the sampled signal,
wherein said sample and store means supplies the sampled signal stored therein to said feedback circuit.

* * * * *

UNITED STATES PATENT AND TRADEMARK OFFICE
CERTIFICATE OF CORRECTION

PATENT NO. : 5,247,502
DATED : September 21, 1993
INVENTOR(S) : MIKIO SATO

It is certified that error appears in the above-identified patent and that said Letters Patent is hereby corrected as shown below:

ON THE TITLE PAGE:

[57] ABSTRACT

Line 6, "sate" should read --state--.
    Line 8, delete "to the recording medium".

COLUMN 1

Line 33, "to" should be deleted.

COLUMN 3

Line 43, "one-rotation" should read --one rotation--.

COLUMN 4

Line 9, "one-rotation" should read --one rotation--.
    Line 12, "one-rotation" should read --one rotation--.
    Line 16, "one-period" should read --one period--.

Signed and Sealed this

Nineteenth Day of April, 1994

Attest:

BRUCE LEHMAN

Attesting Officer      Commissioner of Patents and Trademarks